United States Patent
Inaba et al.

(10) Patent No.: US 7,303,039 B2
(45) Date of Patent: Dec. 4, 2007

(54) DAMPING FORCE CONTROLLER OF SHOCK ABSORBER FOR MOTORCYCLE

(75) Inventors: Kazumi Inaba, Shizuoka (JP); Toshiyasu Terui, Shizuoka (JP); Hiromi Fukuda, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 11/033,921

(22) Filed: Jan. 12, 2005

(65) Prior Publication Data

US 2005/0167943 A1 Aug. 4, 2005

(30) Foreign Application Priority Data

Jan. 19, 2004 (JP) ............................ 2004-010192

(51) Int. Cl.
- *B62D 61/02* (2006.01)
- *B62K 11/00* (2006.01)
- *B62M 7/00* (2006.01)

(52) U.S. Cl. ...................................... 180/227; 180/219

(58) Field of Classification Search ................ 280/270, 280/272, 279; 180/219; 188/294, 306–310
See application file for complete search history.

(56) References Cited

U.S. PATENT DOCUMENTS

| 4,948,163 | A | 8/1990 | Kikushima et al. |
| 5,211,420 | A * | 5/1993 | Iwashita .................. 280/5.503 |
| 6,360,148 | B1 | 3/2002 | Halpin |
| 6,726,232 | B2 * | 4/2004 | Hasegawa et al. .......... 280/272 |

FOREIGN PATENT DOCUMENTS

| EP | 0 556 055 | 8/1993 |
| JP | 06-029191 Y2 | 8/1994 |

* cited by examiner

*Primary Examiner*—Lesley D. Morris
*Assistant Examiner*—Marc A. Scharich
(74) *Attorney, Agent, or Firm*—Keating & Bennett, LLP

(57) ABSTRACT

A damping force controller of a motorcycle shock absorber enables the motorcycle to jump high when needed in a stabilized attitude and to run downhill in a stabilized manner while preventing the rear wheel from bouncing. The damping force controller of a motorcycle shock absorber is adapted to regulate the damping force, wherein the extension damping force of the rear wheel shock absorber at the moment at which the vehicle is beginning to jump is regulated to be smaller than the extension damping force for a normal run.

19 Claims, 4 Drawing Sheets

DAMPING FORCE CONTROLLER OF SHOCK ABSORBER FOR MOTORCYCLE

BACKGROUND OF THE INVENTION

1. Field of the Invention

The present invention relates to a damping force controller of a shock absorber for a motorcycle adapted to regulate the damping force.

2. Description of the Related Art

A conventional damping force controller of a motorcycle shock absorber adapted to regulate the damping force prevents the vehicle body tail from sinking at a time of start up and abrupt acceleration (refer to JP-Y-Hei 06-029191, for example). This damping force controller is adapted to calculate an acceleration factor from the gear position and the vehicle speed, predict the amount of tail sinking from the acceleration factor and a throttle opening speed, and control the damping force of the shock absorber according to the predicted amount of tail sinking.

For example, a motorcycle used for a motocross race constantly runs on cross-country racecourses including climbing uphill followed by jumping over large undulations in succession and running steep downhill. This type of motorcycle must be capable of jumping high when needed in a stabilized attitude and running a steep downhill in a stabilized manner while preventing the rear wheel from bouncing. However, because the damping force controller of the prior art cited above is not intended for such a ride as described above, it cannot meet the above-noted requirements.

SUMMARY OF THE INVENTION

In order to overcome the problems described above, preferred embodiments of the present invention provide a damping force controller of a motorcycle shock absorber that enables the motorcycle to jump high when needed in a stabilized attitude and run a steep downhill in a stabilized running attitude while preventing the rear wheel from bouncing.

According to a first preferred embodiment of the present invention, a damping force controller of a shock absorber for a motorcycle is constructed to regulate the damping force such that the extension damping force of the rear wheel shock absorber when the motorcycle begins to jump is controlled to be smaller than the extension damping force for the normal run of the motorcycle.

The invention according to a second preferred embodiment relates to a damping force controller of a shock absorber for a motorcycle adapted to regulate the damping force, in which the extension damping force of the rear wheel shock absorber when the motorcycle runs downhill is controlled to be greater than the extension damping force for the normal run of the motorcycle.

The invention according to a third preferred embodiment relates to a damping force controller of a shock absorber for a motorcycle adapted to regulate the damping force, in which the extension damping force is regulated according to the throttle position or throttle closing speed and a brake application signal.

The invention according to a fourth preferred embodiment relates to the third preferred embodiment, in which the extension damping force of the rear wheel shock absorber is controlled to be smaller than the extension damping force for the normal run of the motorcycle when the throttle position is smaller than a reference position or the throttle closing speed is greater than a reference closing speed and no brake application signal is given.

The invention according to a fifth preferred embodiment relates to the third or fourth preferred embodiments, in which the extension damping force of the rear wheel shock absorber is controlled to be greater than the extension damping force for the normal run of the motorcycle when the throttle position is smaller than a reference position or the throttle closing speed is greater than a reference closing speed and a brake application signal is given.

The invention according to the first preferred embodiment is adapted to reduce the extension damping force of the rear wheel shock absorber when the vehicle begins to jump. Accordingly the rear wheel shock absorber is forced to extend long so that the vehicle can jump high in a stabilized attitude without a rider being required of high degree of maneuver technique.

The invention according to the second preferred embodiment is adapted to increase the extension damping force of the rear wheel shock absorber when the motorcycle runs downhill. Therefore, the rear wheel shock absorber is restricted from extending and accordingly the rear wheel is restricted from bouncing so that downhill run is possible in a stabilized attitude without a rider being required of high degree of maneuver technique.

The invention according to the third preferred embodiment is adapted to regulate the extension damping force according to the throttle position or throttle closing speed and a brake application signal. Therefore, the state of the vehicle, beginning to jump or running downhill, is determined easily and securely.

The invention for example according to the fourth preferred embodiment is adapted to determine the state of beginning to jump when the throttle position is smaller than a reference position or the throttle closing speed is greater than a reference closing speed and no brake application signal is given, and to reduce the extension damping force of the rear wheel shock absorber. Therefore, the state of the vehicle, beginning to jump, is determined easily and securely, so that the vehicle can jump high in a stabilized attitude.

The invention according to the fifth preferred embodiment is adapted to determine that the vehicle is running downhill when the throttle position is smaller than a reference position or the throttle closing speed is greater than a reference closing speed and a brake application signal is given, and the extension damping force of the rear wheel shock absorber is made greater than the extension damping force for the normal run of the motorcycle. Therefore, a downhill run state of the vehicle is determined easily and securely and it is possible to restrict the rear wheel from bouncing, and stabilize running attitude.

Other features, elements, steps, characteristics and advantages of the present invention will become more apparent from the following detailed description of preferred embodiments with reference to the attached drawings.

DETAILED DESCRIPTION OF PREFERRED EMBODIMENTS

Figure 1:
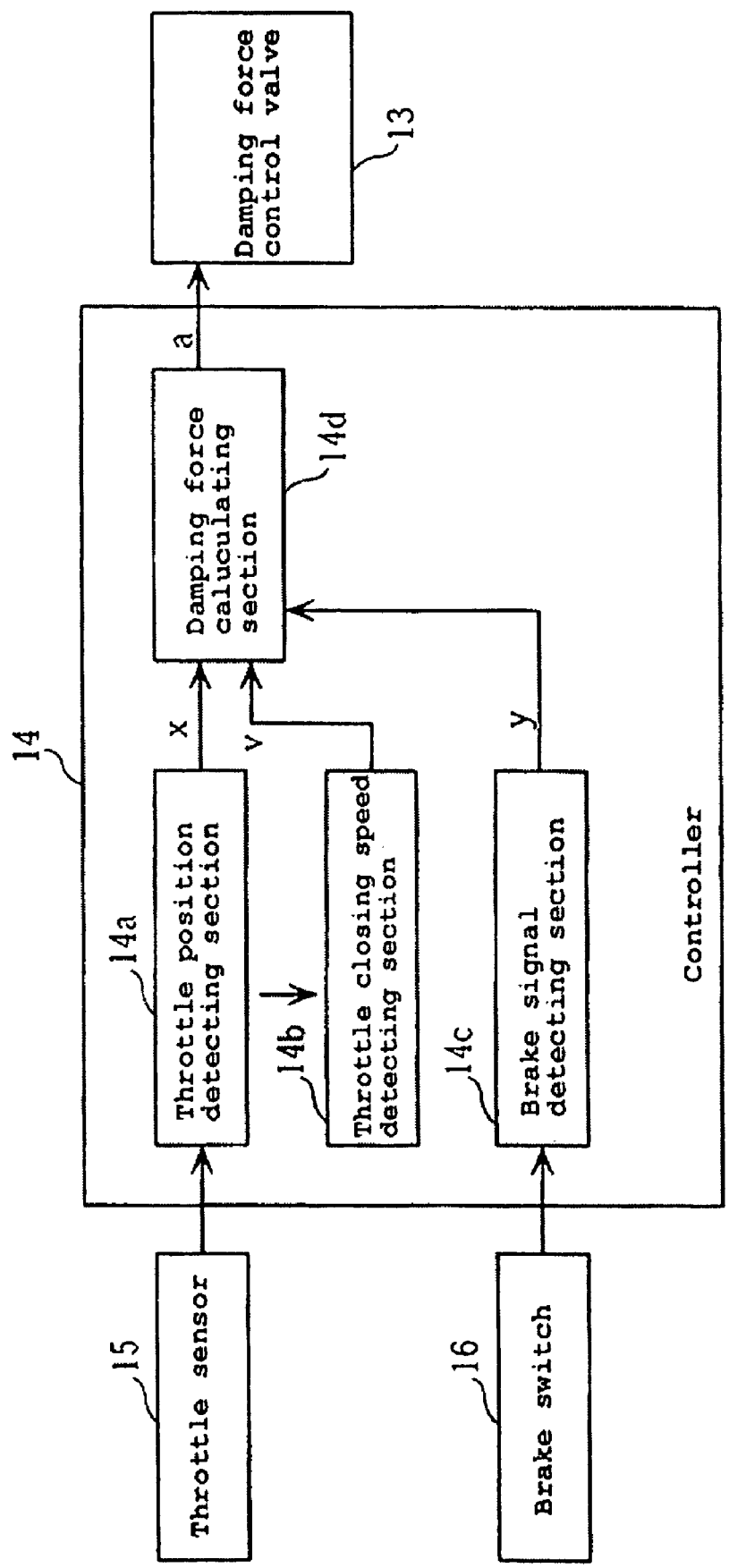
FIG. 1 shows a block constitution of a damping force controller according to a preferred embodiment of the present invention.
Figure 2:
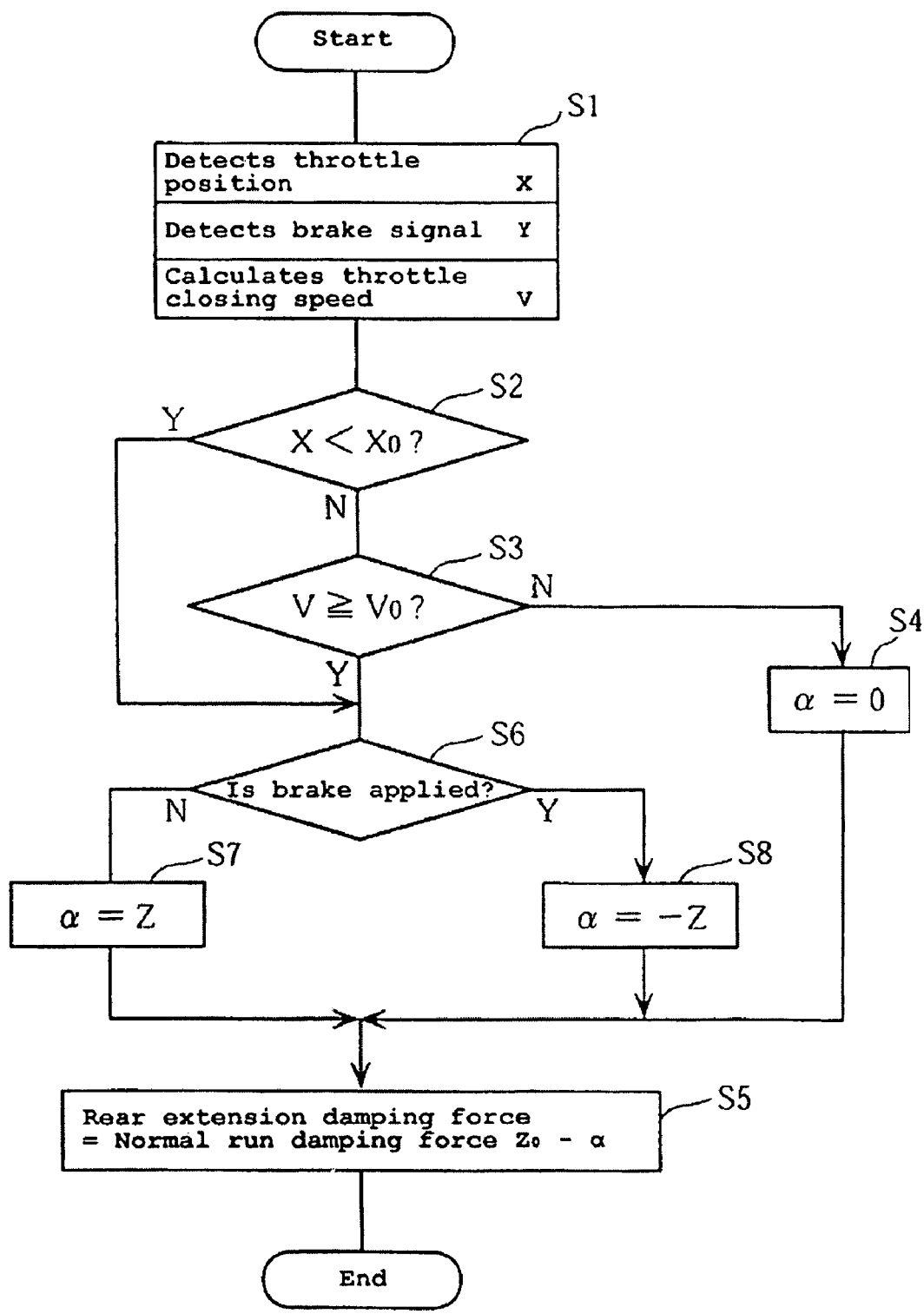
FIG. 2 is a flowchart for explaining the function of the damping force controller according to a preferred embodiment of the present invention.
Figure 3:
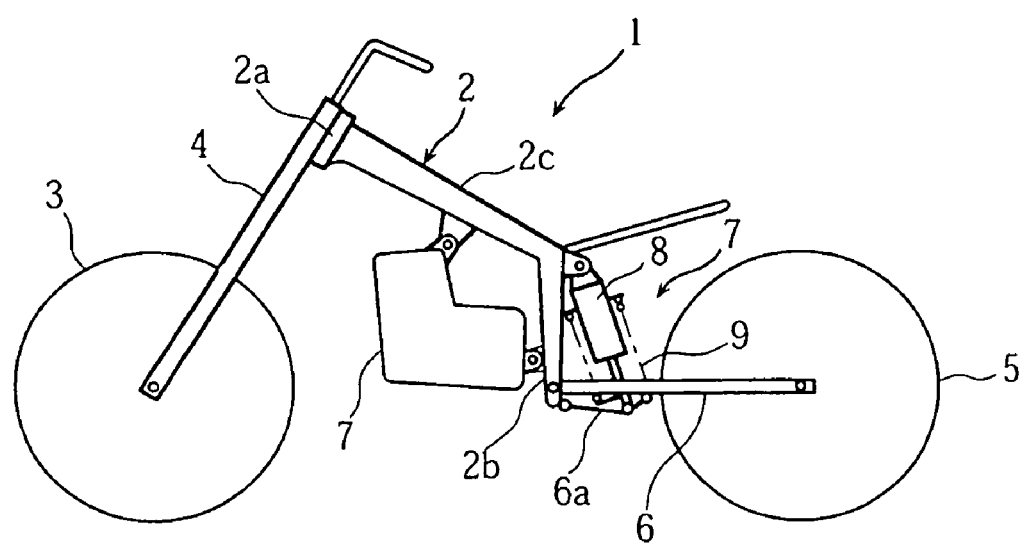
FIG. 3 is a simplified side view of a motorcycle provided with the damping force controller according to a preferred embodiment of the present invention.
Figure 4:
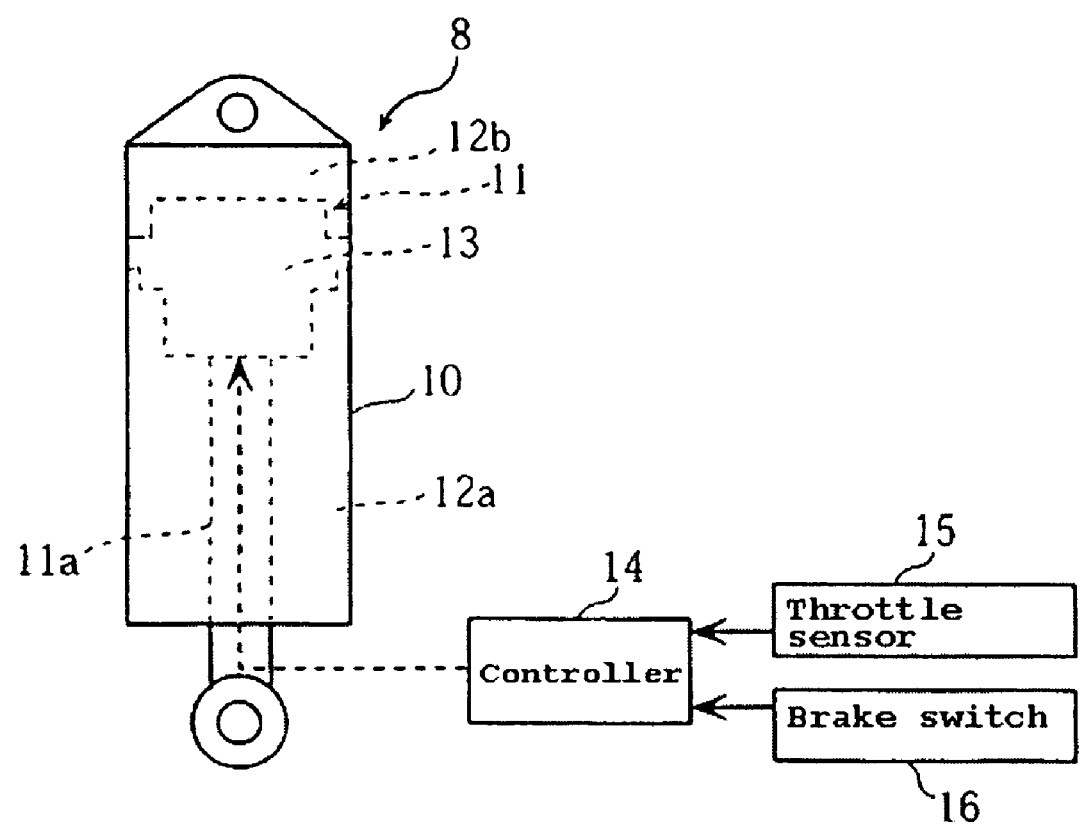
FIG. 4 is a conceptual view of the damping force controller according to a preferred embodiment of the present invention.

FIGS. 1 to 4 are used to explain a damping force controller of a motorcycle shock absorber according to a preferred embodiment of the invention. FIG. 1 shows a block constitution of a damping force controller according to a preferred embodiment of the present invention. FIG. 2 is a flowchart for explaining the function of the damping force controller according to a preferred embodiment of the present invention. FIG. 3 is a simplified side view of a motorcycle including the damping force controller according to a preferred embodiment of the present invention. FIG. 4 is a conceptual view of the damping force controller according to a preferred embodiment of the present invention.

In the drawings, a motorcycle 1 is provided with a damping force controller according to a preferred embodiment of the present invention. Generally, the motorcycle 1 preferably includes a vehicle body frame 2 with a head pipe 2a rotatably supporting a front fork 4 to be steered to the right and left with its lower end rotatably supporting a front wheel 3; a rear arm 6 with its rear end rotatably supporting a rear wheel 5 to swing up and down about a pivot on a rear arm bracket 2b; and an engine unit 7 suspended from a main frame 2c.

A rear wheel suspension system 7 is stretched between the upper portion of the rear arm bracket 2b and the rear arm 6 along the vehicle center line. The rear wheel suspension system 7 preferably includes a damping force variable control type of shock absorber 8 and a coil spring 9 surrounding the shock absorber 8.

The shock absorber 8 preferably includes a piston 11 inserted for free sliding within a cylinder 10. The interior of the cylinder 10 preferably includes an extension side oil chamber 12a in which oil pressure increases in the extension stroke and a contraction side oil chamber 12b in which oil pressure increases in the contraction stroke. The lower end of a piston rod 11a connected to the piston 11 is connected through a linkage 6a to the rear arm 6. The upper end of the cylinder 10 is connected to the upper portion of the rear arm bracket 2b.

The piston 11 is provided with a built-in damping force control valve 13 for regulating the damping force produced by the relative motion of the piston 11. The damping force control valve 13 is preferably of a type that regulates the cross-sectional area of the passage for introducing working oil in the extension side oil chamber 12a into the contraction side oil chamber 12b preferably via a linear solenoid, and is arranged such that the extension damping force decreases as the passage cross-sectional area increases, and vice versa.

As for the motorcycle 1 of this preferred embodiment, when the rear wheel 5 passes over a bump, for example, the rear arm 6 swings up. The impact force produced by the upswing is absorbed by the contraction of the coil spring 9. When the shock absorber 8 contracts, oil in the contraction side oil chamber 12b flows into the extension side oil chamber 12a through an orifice in the piston 13 to produce a contraction damping force, which also absorbs the impact force.

On the other hand, when the shock absorber 8 is extended by the resilient force of the coil spring 9, moving from the contraction stroke onto the extension stroke, oil in the extension side oil chamber 12a flows into the contraction side oil chamber 12b to produce an extension damping force. The present preferred embodiment is constructed such that the extension damping force is regulated by regulating the passage area for the oil by the damping force control valve 13. When the extension damping force decreases, the shock absorber 8 is forced to extend with the resilient force of the coil spring 9. In contrast, when the extension damping force increases, the shock absorber 8 becomes less easy to extend.

The motorcycle 1 of the present preferred embodiment is also provided with a controller 14 for regulating the damping force produced with the damping force control valve 13 to a specified value according to the running state of the vehicle. A signal from a throttle sensor 15 for detecting the throttle valve position (opening) of the throttle valve for regulating the intake passage area, and a signal from a brake switch 16 for detecting whether or not the brake is depressed, are inputted to the controller 14.

The controller 14 preferably includes a throttle position detecting section 14a for determining the throttle position (opening) x from the signal coming from the throttle sensor 15; a throttle closing speed detecting section 14b for determining the throttle closing speed v; a brake signal detecting section 14c for determining from the signal coming from the brake switch 16 whether or not the brake is being applied; and a damping force calculating section 14d for calculating a necessary damping force (a) on the basis of the detected throttle position (opening) x, the detected throttle closing speed v, and the brake signal y and outputting a damping force signal (a) to the damping force control valve 13.

The controller 14 controls the damping force control valve 13 so that the extension damping force of the rear wheel shock absorber 8 when the motorcycle begins to jump is smaller than the extension damping force for the normal run of the motorcycle and also controls the damping force control valve 13 so that the extension damping force of the rear wheel shock absorber 8 when the motorcycle runs a steep downhill is equal to or slightly greater than the extension damping force for the normal run of the motorcycle. Incidentally, the term "normal run" as used for the present preferred embodiment means the run of the motorcycle on a flat road, neither uphill nor downhill, with the throttle valve opening relatively wide (in the vicinity of fully wide open).

Here in the present preferred embodiment, the vehicle is determined to be in the state of beginning to jump when the throttle position (opening) x is not greater than a reference position (nearly fully closed) or the throttle closing speed v is not less than a reference closing speed, and when the brake is not applied. When the throttle position (opening) x is not greater than a reference position (nearly fully closed) or the throttle closing speed v is not less than a reference closing speed, and the brake is applied, the vehicle is determined to be in the state of running on a steep downhill.

The present preferred embodiment is constituted in that the vehicle is determined to be in the state of beginning to jump when the throttle position (opening) x is not greater than a reference position (nearly fully closed) or the throttle closing speed v is not less than a reference closing speed, and the brake is not being applied; and the vehicle is determined to be in the state of running on a steep downhill when the brake is being applied. The above-described unique constitution makes it possible to determine easily and securely the moment at which the vehicle is beginning to jump or running downhill.

The operation of the present preferred embodiment is described according to the flowchart of FIG. 2. When the throttle position x, the brake signal y, and the throttle closing speed v are calculated (step S1) and are such that the throttle position x is not smaller than a reference position $x_0$, and the throttle closing speed v is not greater than or equal to a reference closing speed $v_0$ (steps S2 and S3), a damping force compensation value is determined to be $\alpha=0$ (step S4), and the extension damping force of the rear wheel shock absorber 8 is controlled to be equal to (normal run damping force $z_0$–0) (step S5).

On the other hand, when the throttle position (opening) x is smaller than the reference position $x_0$ (nearly fully closed) in step S2, or the throttle closing speed v is not less than the reference closing speed $v_0$ in step S3, and the brake is not being applied (step S6), the vehicle is determined to be in the state of beginning to jump and the damping force compensation value $\alpha$ is determined to be z (step S7), and the extension damping force of the rear wheel shock absorber 8 is controlled to be equal to (normal run damping force $z_0$–z) (step S5). As a result, the rear wheel shock absorber 8, with its decreased extension damping force, can extend easily, and the vehicle can jump high in a stabilized attitude.

When step S6 results in the brake being applied, the vehicle is determined to be in the state of running on a steep downhill and the damping force compensation value a is determined to be –z (step S8), and the extension damping force of the rear wheel shock absorber 8 is controlled to be equal to (normal run damping force $z_0$+z) (step S5). As a result, the rear wheel shock absorber 8, with its increased extension damping force, extends less easily, so that the real wheel is prevented from bouncing and the vehicle can run in a stabilized attitude.

According to the present preferred embodiment as described above, the extension damping force of the rear wheel shock absorber 8 is reduced when the vehicle begins to jump, the rear wheel shock absorber 8 is forced to extend lengthwise by a sufficient amount, and the vehicle can jump high in a stabilized attitude without the rider being required to use a high degree of maneuvering techniques.

When the vehicle runs downhill, the rear wheel shock absorber 8, with its extension damping force increased, is prevented from extending, and the rear wheel 5 is prevented accordingly from bouncing, and the running attitude is stabilized without the rider being required to use a high degree of maneuvering techniques.

While the present invention has been described with respect to preferred embodiments thereof, it will be apparent to those skilled in the art that the disclosed invention may be modified in numerous ways and may assume many embodiments other than those specifically set out and described above. Accordingly, it is intended by the appended claims to cover all modifications of the invention which fall within the true spirit and scope of the invention.

What is claimed is:

1. A damping force controller of a shock absorber for a motorcycle adapted to regulate a damping force of the shock absorber, wherein the damping force controller controls an extension damping force of the shock absorber when the motorcycle begins to jump such that the extension damping force is smaller than an extension damping force for a normal run of the motorcycle; and the damping force controller determines that the motorcycle is in a state of beginning to jump when a throttle position is not greater than a reference position or a throttle closing speed is not less than a reference closing speed, and a brake is not being applied.

2. The damping force controller according to claim 1, wherein the shock absorber is a rear wheel shock absorber.

3. The damping force controller according to claim 1, wherein the damping force controller includes at least one of a throttle position detector, a throttle closing speed detector and a brake signal detector.

4. The damping force controller according to claim 3, wherein the damping force controller includes a damping force calculator that receives a signal from the at least one of the throttle position detector, the throttle closing speed detector and the brake signal detector.

5. The damping force controller according to claim 1, wherein the damping force controller includes a damping force calculator that calculates the damping force of the shock absorber and outputs a signal to a damping force control valve.

6. A motorcycle including the damping force controller according to claim 1.

7. A damping force controller of a shock absorber for a motorcycle adapted to regulate a damping force of the shock absorber, wherein the damping force controller includes a throttle position sensor, a throttle closing speed detector, and a brake signal detector, and the damping force controller controls an extension damping force of the shock absorber when the motorcycle runs downhill to be greater than an extension damping force for a normal run of the motorcycle.

8. The damping force controller according to claim 7, wherein the shock absorber is a rear wheel shock absorber.

9. The damping force controller according to claim 7, wherein the damping force controller includes a damping force calculator that receives a signal from at least one of the throttle position detector, the throttle closing speed detector and the brake signal detector.

10. The damping force controller according to claim 7, wherein the damping force controller includes a damping force calculator that calculates the damping force of the shock absorber and outputs a signal to a damping force control valve.

11. A motorcycle including the damping force controller according to claim 7.

12. A damping force controller of a shock absorber for a motorcycle adapted to regulate a damping force of the shock absorber, wherein the damping force controller controls an extension damping force according to a throttle position, a throttle closing speed and a brake application signal.

13. The damping force controller according to claim 12, wherein the damping force controller controls the extension damping force of the shock absorber such that the extension damping force is smaller than an extension damping force for a normal run of the motorcycle when the throttle position is smaller than a reference position or when the throttle closing speed is greater than a reference closing speed and when no brake application signal is given.

14. The damping force controller according to claim 12, wherein the damping force controller controls the extension damping force of the shock absorber such that the extension damping force is greater than an extension damping force for a normal run of the motorcycle when the throttle position is smaller than a reference position or when the throttle closing speed is greater than a reference closing speed and when a brake application signal is given.

15. The damping force controller according to claim 12, wherein the shock absorber is a rear wheel shock absorber.

16. The damping force controller according to claim 12, wherein the damping force controller includes at least one of a throttle position detector, a throttle closing speed detector and a brake signal detector.

17. The damping force controller according to claim 16, wherein the damping force controller includes a damping force calculator that receives a signal from the at least one of the throttle position detector, the throttle closing speed detector and the brake signal detector.

18. The damping force controller according to claim 12, wherein the damping force controller includes a damping force calculator that calculates the damping force of the shock absorber and outputs a signal to a damping force control valve.

19. A motorcycle including the damping force controller according to claim 12.

* * * * *